(12) United States Patent
Seitzer et al.

(10) Patent No.: US 10,000,185 B2
(45) Date of Patent: Jun. 19, 2018

(54) PRESSURE UNIT AND END FITTING HAVING A PRESSURE UNIT OF THIS TYPE

(71) Applicant: TRW AUTOMOTIVE GMBH, Alfdorf (DE)

(72) Inventors: Dominik Seitzer, Waldstetten (DE); Pawel Gorecki, Myskow (PL); Michal Kacprzak, Schwäbisch Gmünd (DE)

(73) Assignee: TRW Polska SP.ZO.O (PL)

( * ) Notice: Subject to any disclaimer, the term of this patent is extended or adjusted under 35 U.S.C. 154(b) by 0 days. days.

(21) Appl. No.: 15/319,395

(22) PCT Filed: Jun. 29, 2015

(86) PCT No.: PCT/EP2015/001304
§ 371 (c)(1),
(2) Date: Dec. 16, 2016

(87) PCT Pub. No.: WO2016/000815
PCT Pub. Date: Jan. 7, 2016

(65) Prior Publication Data
US 2017/0120862 A1 May 4, 2017

(30) Foreign Application Priority Data
Jul. 3, 2014 (EP) .................................... 14002281

(51) Int. Cl.
*B60R 22/36* (2006.01)
*B60R 22/46* (2006.01)
*F16B 41/00* (2006.01)

(52) U.S. Cl.
CPC ...... *B60R 22/4619* (2013.01); *B60R 22/4628* (2013.01); *F16B 41/002* (2013.01); *B60R 2022/4642* (2013.01)

(58) Field of Classification Search
CPC ............ B60R 22/4619; B60R 22/4628; B60R 22/1952; B60R 22/1954; B60R 22/3408; B60R 22/46; B60R 2022/3427; B60R 2022/4647; B60R 2022/4642
USPC ......... 280/806, 807; 242/374, 379; 297/475, 297/480
See application file for complete search history.

(56) References Cited

U.S. PATENT DOCUMENTS 3,388,227 A 6/1968 Basso et al.
6,131,951 A * 10/2000 Chicken ................ B60R 21/017
280/806
6,142,525 A 11/2000 Boelstler et al.
(Continued)

Primary Examiner — Toan To
(74) Attorney, Agent, or Firm — Tarolli, Sundheim, Covell & Tummino LLP

(57) ABSTRACT

The invention relates to a pressure unit (64) for pressurizing a belt shaft (12) in a seat belt system comprising a screw (66) for fastening the pressure unit (64) to a frame (18) of the seat belt system, the screw (66) including a screw head (68) and a screw shank (70), wherein the pressure unit (64) comprises a fastening portion (72) having a screw hole (74) for inserting the screw shank (70), wherein radial play is provided between the screw hole (74) and the screw shank (70) and the fastening portion (72) on the screw head side includes mounting arms (76) for axially fixing the screw (66) in a pre-assembly position. Moreover, the invention also comprises an end fitting (11) of a seat belt system comprising such pressure unit (64).

14 Claims, 5 Drawing Sheets

(56) References Cited

U.S. PATENT DOCUMENTS

| | | | |
|---|---|---|---|
| 6,460,935 B1* | 10/2002 | Rees | B60R 22/1952 |
| | | | 280/806 |
| 6,659,548 B2* | 12/2003 | Becker | B60N 2/0276 |
| | | | 297/216.1 |
| 7,118,132 B2* | 10/2006 | Terasaki | B60R 22/1951 |
| | | | 280/806 |
| 7,188,868 B2* | 3/2007 | Yamaguchi | B60R 22/195 |
| | | | 280/806 |
| 9,333,944 B2* | 5/2016 | Ahn | B60R 22/4628 |
| 9,499,121 B2* | 11/2016 | Dingman | B60R 22/201 |
| 9,623,836 B2* | 4/2017 | Kujawa | B60R 22/195 |
| 9,809,193 B2* | 11/2017 | Marriott | B60R 22/203 |
| 2005/0189758 A1* | 9/2005 | Zierle | B60R 21/055 |
| | | | 280/801.2 |
| 2013/0313814 A1* | 11/2013 | Marziani | B60R 22/18 |
| | | | 280/805 |
| 2014/0265517 A1 | 9/2014 | Betz et al. | |
| 2014/0367946 A1* | 12/2014 | Osterhout | B60R 13/025 |
| | | | 280/730.2 |
| 2015/0191149 A1* | 7/2015 | Isayama | B60R 22/1954 |
| | | | 280/806 |

* cited by examiner

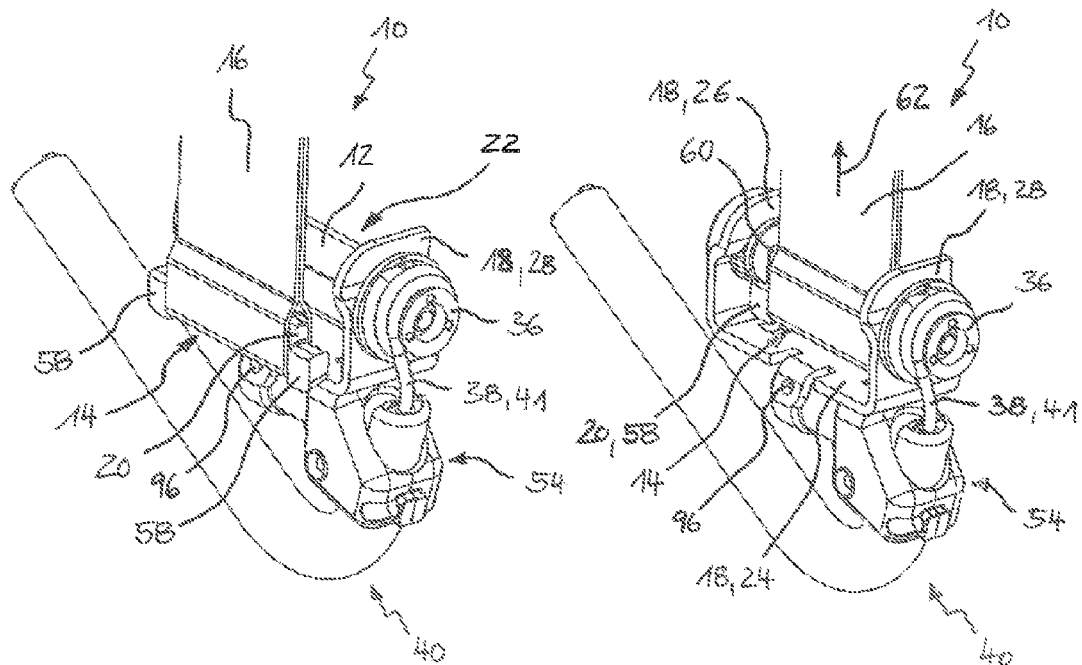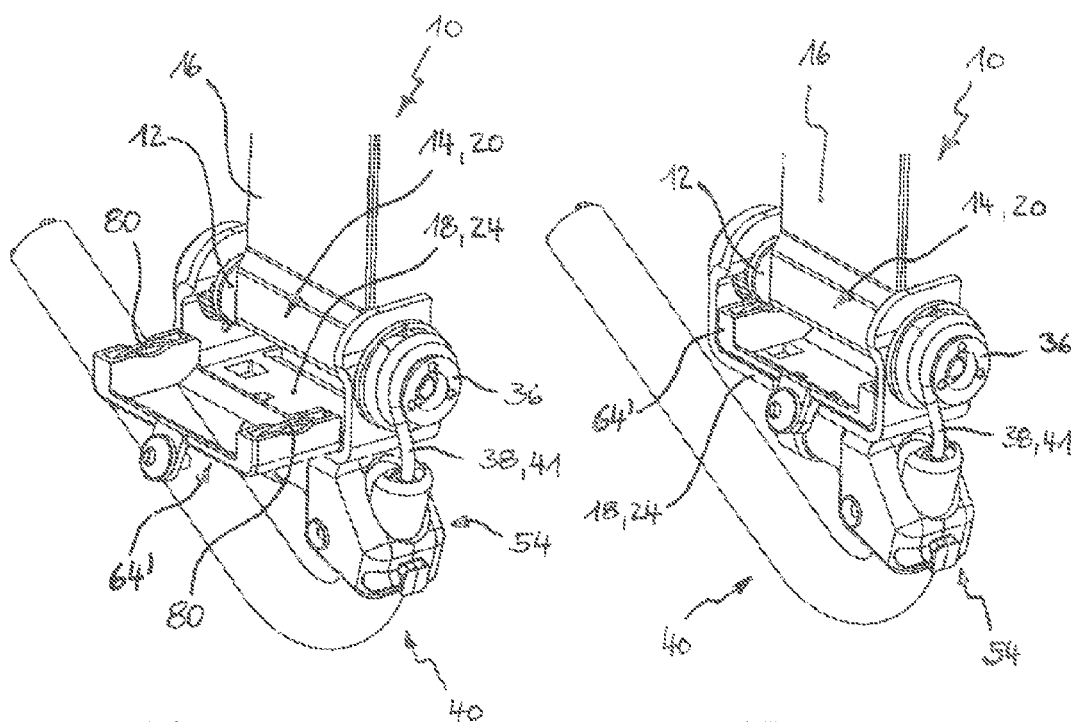

PRESSURE UNIT AND END FITTING HAVING A PRESSURE UNIT OF THIS TYPE

RELATED APPLICATIONS

This application corresponds to PCT/EP2015/001304, filed Jun. 29, 2015, which claims the benefit of EP Application No. 14002281.5, filed Jul. 3, 2014, the subject matter, of which are incorporated herein by reference in their entirety.

BACKGROUND OF THE INVENTION

The invention relates to a pressure unit for pressurizing a belt shaft in a seat belt system comprising a screw for fastening the pressure unit to a frame of the seat belt system, wherein the screw includes a screw head and a screw shank and wherein the pressure unit comprises a fastening portion having a screw hole for inserting the screw shank. Further, the invention relates to an end fitting comprising said pressure unit, with a tensioner drive being preferably provided which is adapted to drive the belt shaft in a winding direction.

Belt tensioners for seat belt systems are generally known from automotive engineering. In so called end fitting tensioners in the case of activation of the belt tensioner the actually fixed end of webbing usually connected to the seat frame or the vehicle body is tightened to provide for tensioning of the entire webbing. In prior art both linearly operating and rotational end fitting tensioners are described. In the case of the rotational end fitting tensioners the webbing end is connected to a belt shaft which is driven upon activation of the belt tensioner so as to wind webbing onto the belt shaft.

For mounting the seat belt system especially with reference to end fitting tensioners increasingly there is wanted a process in which the webbing end is not fastened to the belt tensioner before the belt tensioner has been mounted on the vehicle body or on the seat frame.

In order to enable such subsequent fastening of the webbing with minimum assembly effort, DE 10 2011 117 052 A1 suggests an end fitting tensioner for a seat belt system comprising a frame, a belt shaft being rotatably supported in the frame about an axis as well as a belt shaft insertion element to which one end of webbing is fastened, wherein the belt shaft includes a recess for receiving the belt shaft insertion element and wherein the belt shaft insertion element can be inserted substantially radially into the recess. Moreover, there is provided a generic pressure unit which in the completely mounted state of the end fitting pressurizes the belt shaft into its locking position and thus ensures high functional safety of the end fitting tensioner.

SUMMARY OF THE INVENTION

It is the object of the invention to provide a pressure unit which is easy to manufacture and inexpensive and which can be permanently and reliably fastened to the frame of an end fitting with minimum assembly effort.

This object is achieved, according to the invention, by a pressure unit of the type as described in the beginning in which radial play is provided between the screw hole and the screw shank and on the screw head side the fastening portion includes mounting arms for axially fixing the screw in a pre-assembly position. This results in an advantageous sub-assembly of the pressure element and the screw, the screw being pre-assembled on the fastening portion of the pressure unit.

In an embodiment the fastening portion includes a first frame-side contact surface and an axially opposed second screw head-side contact surface, with the end of the screw facing away from the screw head being arranged in the pre-assembly position axially between a free end of the mounting arms and the first contact surface of the fastening portion. Accordingly, the screw forms a pre-assembled sub-assembly together with the pressure unit, but it does not project from the frame-side contact surface of the fastening portion so that the pressure unit can be easily positioned relative to the frame of the end fitting.

In a further embodiment the screw is a collar screw having a screw collar in the axial direction between the screw head and the screw shank, with the diameter of the screw collar being between the diameter of the screw shank and the diameter of the screw head. The screw collar thus forms a stop when the screw is screwed into the frame of the end fitting and consequently in a simple manner defines a desired distance between the screw head and the frame.

Preferably in this embodiment a minimum dimension of the screw hole perpendicularly to the shank axis of the screw is larger than the diameter of the screw collar and smaller than the diameter of the screw head. Thus an edge of the screw hole forms a stop for the screw head, whereas the screw collar can be received in the screw hole.

Furthermore, the thickness of the fastening portion at the edge of the screw hole may be slightly larger than the length of the screw collar. Slightly larger in this context means in particular that the thickness of the fastening portion is larger than the length of the screw collar by at most 1 mm, preferably by at most 0.5 mm. If the material of the fastening portion exhibits certain deformability, the pressure unit thus can be fastened to the frame with a defined bias.

Of preference, the screw collar includes a groove peripheral in the circumferential direction, with the mounting arms of the pressure unit engaging in said groove in the pre-assembly position of the screw. In this way, the screw can be axially fixed in the pre-assembly position relative to the pressure unit with minimum effort.

In another embodiment of the pressure unit the mounting arms are radially elastic spring arms, especially two opposed radially elastic spring arms loading the screw radially inwardly in the pre-assembly position.

Preferably, the mounting arms include inclined surfaces facing the screw head on which, when axially loaded, the screw head is adapted to slide in the direction of the first frame-side contact surface, wherein the spring arms will deform radially outwardly.

In another embodiment the pressure unit comprises a plastic member formed integrally with the fastening portion. For example, the plastic member is a simple injection-molded part and thus allows especially low-cost manufacture of the pressure unit.

Furthermore, the pressure unit preferably comprises at feast one spring element for loading the belt shaft of the seat belt system, wherein said at least one spring element may be partly surrounded by injection molding with plastic material of the plastic member in the form of an injection-molded pad.

For the rest, the technical object is also achieved by an end fitting of a seat belt system comprising an afore-mentioned pressure unit, a frame made from metal and having a threaded hole for fastening the pressure unit to the frame and a belt shaft which is rotatably supported in the frame about an axis, wherein the screw extends, in a fastening position, with radial play through the screw hole of the pressure unit and is screwed into the threaded hole of the frame.

The screw preferably is a collar screw and in the axial direction between the screw head and the screw shank includes a screw collar, with the diameter of the screw collar being between the diameter of the screw shank and the diameter of the screw head, wherein the screw head on the collar side has a contact surface for the fastening portion and the screw collar on the shank side has a contact surface for the frame.

Especially preferred, the thickness of the fastening portion is slightly larger than the length of the screw collar, wherein in the fastening position of the screw the contact surface of the screw head contacts the fastening portion and the contact surface of the screw collar contacts the frame. Slightly larger in this context means in particular that the thickness of the fastening portion is larger than the length of the screw collar by at most 1 mm, preferably by at most 0.5 mm. Screwing the screw up to a metal/metal contact between the contact surface of the screw collar and the frame will permanently result in a defined and reliable fastening of the pressure unit on the frame of the end fitting, while the fastening portion is biased. The fastening is especially independent of the materiel of the fastening portion. This is of particular advantage with a preferred manufacture of the fastening portion of plastic material, because the material behavior of the plastic material which can hardly be estimated over time (creep, ageing) thus will not affect the connection between the pressure unit and the frame.

BRIEF DESCRIPTION OF THE DRAWINGS

Further features and advantages of the invention will be evident from the following description of a preferred embodiment with reference to the drawings, in which:

FIG. 5 illustrates a perspective view of the end fitting tensioner according to FIGS. 1 to 4 prior to assembly of a belt shaft insertion element;

FIG. 6 illustrates a perspective view of the end fitting tensioner according to FIGS. 1 to 4 during assembly of the belt shaft insertion element;

FIG. 7 illustrates a perspective view of the end fitting tensioner according to FIGS. 1 to 4 after assembly of the belt shaft insertion element and prior to assembly of a pressure unit;

FIG. 8 shows a perspective view of the end fitting tensioner according to FIGS. 1 to 4 in the completely assembled state;

DESCRIPTION

Figure 1:
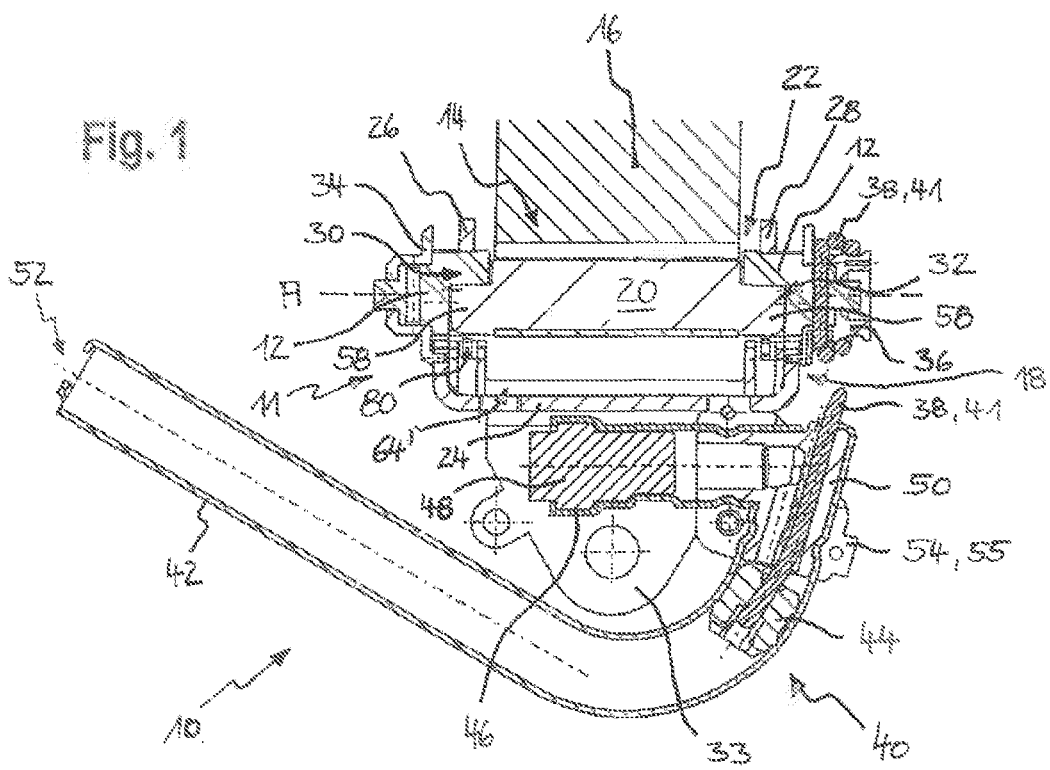
FIG. 1 shows an axial longitudinal section across an end fitting tensioner including a state-of-the-art pressure unit.

FIGS. 1 to 4 illustrate an end fitting tensioner 10 for a seat belt system in an automotive vehicle, comprising an end fitting 11 and a tensioner drive 40. The end fitting 11 comprises a belt shaft 12 to which one end 14 of webbing 16 is fixed and a frame 18 made from metal and being adapted to be fixedly mounted to the vehicle body in which frame the belt shaft 12 is supported, wherein upon activation of the end fitting tensioner 10 the belt shaft 12 can be rotated relative to the frame 18 in a winding direction of the webbing so as to wind up webbing 16.

In the illustrated embodiment the end 14 of the webbing 16 is stitched to form an eye enclosing a belt shall insertion element 20, with the belt shaft insertion element 20 being received in a recess 22 of the belt shaft 12 and being supported relative to the belt shaft 12 in a rotationally fixed manner.

Figure 2:
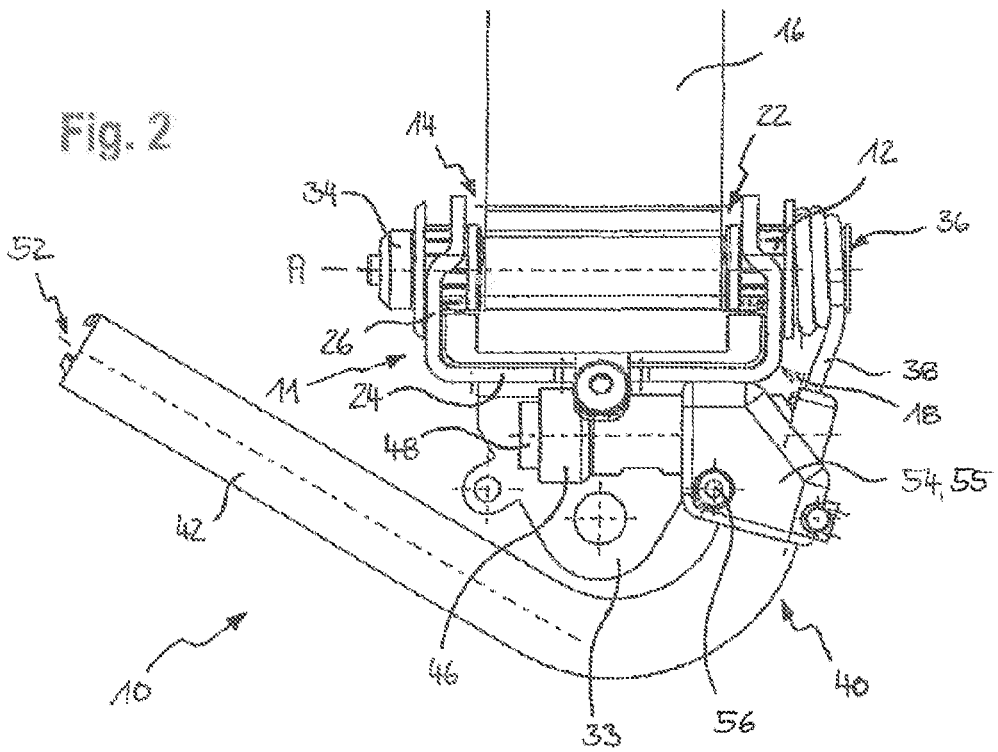
FIG. 2 shows a top view of the end fitting tensioner according to FIG. 1.
Figure 3:
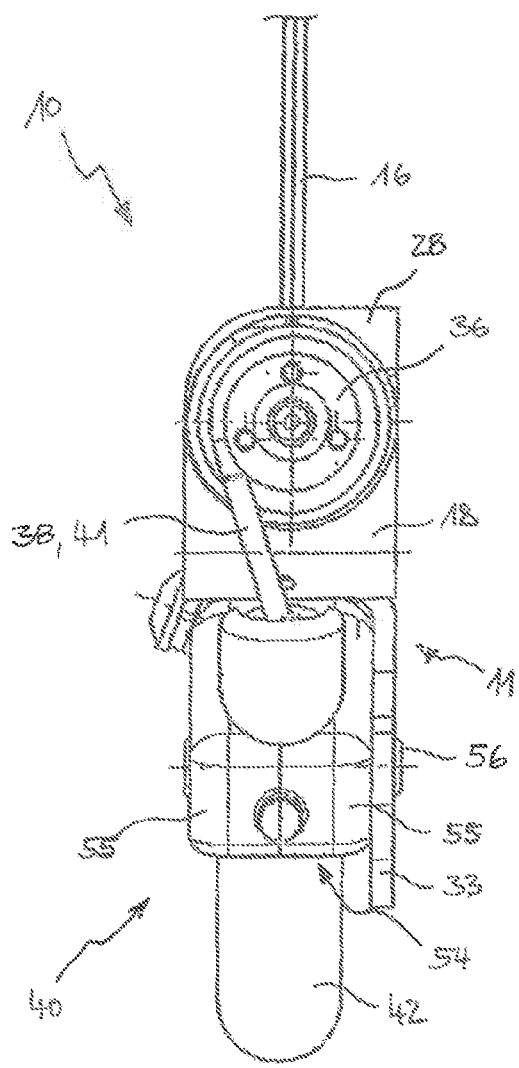
FIG. 3 shows a lateral view of the end fitting tensioner according to FIG. 1.
Figure 4:
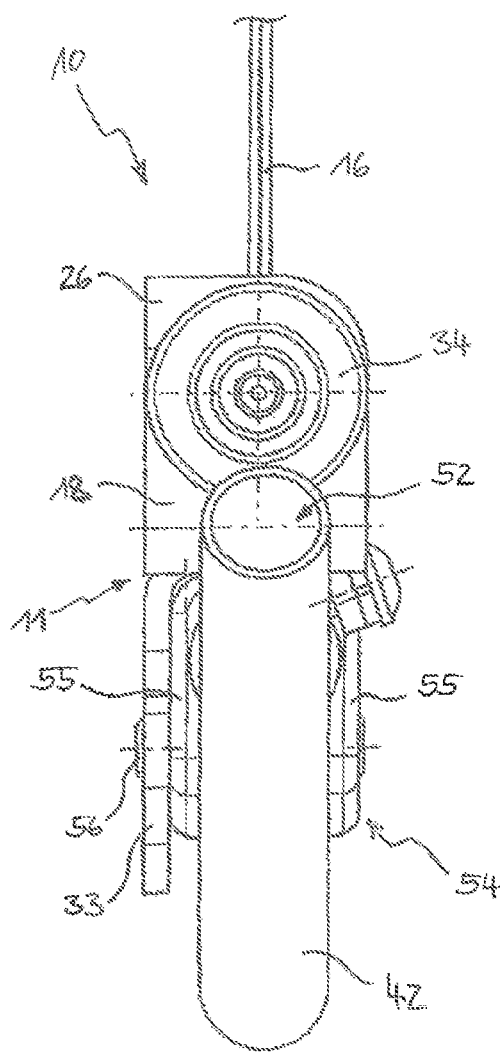
FIG. 4 shows another lateral view of the end fitting tensioner according to FIG. 1.

According to FIG. 2, the frame 18 of the end fitting tensioner 10 is U-shaped and comprises a land 24 as well as two opposed legs 28, 28, each leg 26, 28 having an opening 30, 32 through which the belt shaft 12 extends. Furthermore, a fastening tab 33 bent from the land 24 is provided by which the frame 18 can be tightly connected, especially screwed to a vehicle seat or a vehicle body.

The belt shaft 12 is rotatably supported about an axis A within the frame 18. At the axial ends of the belt shaft 12 a cap 34 and, resp., a rope reel 36 are arranged, the cap 34 and the rope reel 36 being tightly connected to, especially press-fitted with the belt shaft 12 and prevent axial movement of the belt shaft 12 relative to the frame 18 or minimize said movement to little axial play.

For tightening the webbing 16 upon activation of the end fitting tensioner 10 a power transmission element 38 coupling the belt shaft 12 to a tensioner drive 40 is provided. The power transmission element 36 in the illustrated embodiment is a pull rope 41 which is partly wound onto the rope reel 36 and is fastened by one rope end to the rope reel 36.

The tensioner drive 40 of the end fitting tensioner 10 comprises a tensioner tube 42 for receiving and guiding a pressurizing element 44 as well as a separate generator housing 46 for accommodating a gas generator 48. The generator housing 46 in the shown embodiment is a tubular piece so that both the tensioner tube 42 and the generator housing 46 are made from a metal tube, especially a steel tube. Moreover, there is provided a coupling element 50 tightly connecting the generator housing 46 to the tensioner tube 42 (cf. FIG. 1).

According to FIG. 1, the pressurizing element 44 is a piston which is substantially sealed in the bent tensioner tube 42 and is accommodated movably along a tubular axis. The pull rope 41 fastened by one rope and to the rope reel 36 extends from the rope reel 36 into the tensioner tube 42 and is fastened there to the piston by an opposite rope end. Upon activation of the gas generator 48, gas pressure is applied to the piston which moves in the direction of a free tube end 52 of the tensioner tube 42. Accordingly, while rotating the belt shaft 12 pull rope 41 is unwound from the rope real 36 and at the same time webbing 16 is wound onto the belt shaft 12 so that the belt is tensioned.

For the rest, a stabilizing unit 54 is provided to reinforce the connection between the tensioner tube 42 and the generator housing 46 and to provide a simple connection between the tensioner drive 40 and the frame 18. Said stabilizing unit 54 in the present case comprises two stabilizing elements 55, especially made from zinc die casting, and a connecting element 58 e.g. in the form of a tubular rivet (cf. FIGS. 3 and 4).

As a matter of course, the end fitting tensioner 10 according to FIGS. 1 to 4 may also be driven by a hydraulic motor or may be equipped with a different alternative tensioner drive, especially a so called "power snake" drive. "Power snake" in this context denotes a flexible elastically and/or plastically deformable plastic element which is received to be largely sealed and guided to be longitudinally displaceable in the tensioner tube 42.

FIGS. 5 to 8 illustrate the process of subsequent assembly of the webbing 16 on the end fitting 11 of the afore-described end fitting tensioner 10 which was tightly installed already in advance on a seat frame or a body of the vehicle.

According to FIG. 5, the belt shaft insertion element 20 including webbing 16 fixed thereto is supplied to the already installed part of the end fitting 11, until bearing portions 58 of the belt shaft insertion element 20 are located radially outside the fork bearings 60 formed in the belt shaft 12 (cf. FIG. 6).

As indicated in FIG. 6 by an arrow 62, the belt shaft insertion element 20 can then be inserted by radial movement relative to the belt shaft 12 into the recess 22 and the fork bearings 60 so that the belt shaft insertion element 20 is connected to the belt shaft 12 in a rotationally fixed manner (cf. FIG. 7).

In order to prevent the belt shaft insertion element 20 and the webbing 16 fastened thereto from inadvertently loosening from the belt shaft 12, according to FIG. 7 a pressure unit 64' is inserted between the belt shaft 12 and the land 24 of the frame 18 and is fixed on the frame 18 (cf. FIG. 8). The pressure unit 64' is preferably designed so that it can be inserted only when the belt shaft insertion element 20 is correctly mounted on the belt shaft 12 so as to exclude incorrect mounting of the belt shaft insertion element 20 on the belt shaft 12.

While in the FIGS. 1 to 8 the end fitting 11 of the end fitting tensioner 10 including a conventional pressure unit 64' is illustrated, in the FIGS. 9 to 14 a pressure unit 64 according to the invention is shown which is adapted to replace the conventional pressure unit 64' without the residual end fitting 11 having to be constructively modified.

Figure 9:
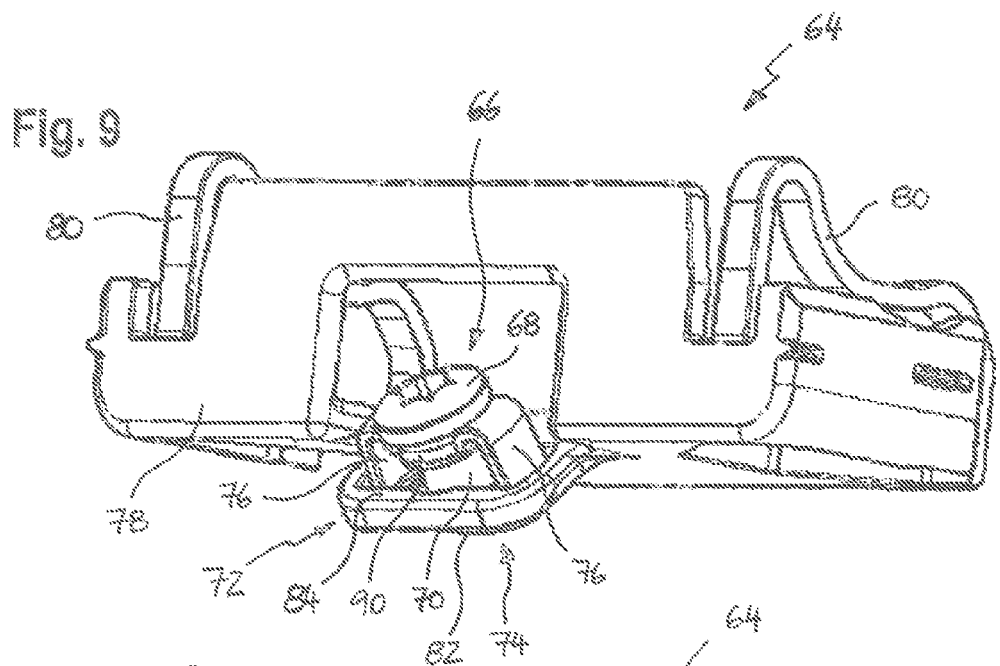
FIG. 9 shows a perspective view of a pressure unit of the invention for the end fitting tensioner according to FIGS. 1 to 8.
Figure 10:
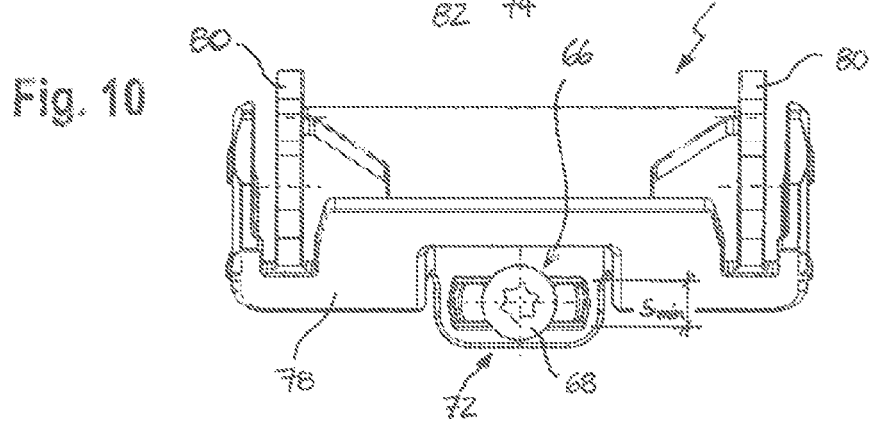
FIG. 10 shows another view of the pressure unit according to FIG. 9.
Figure 11:
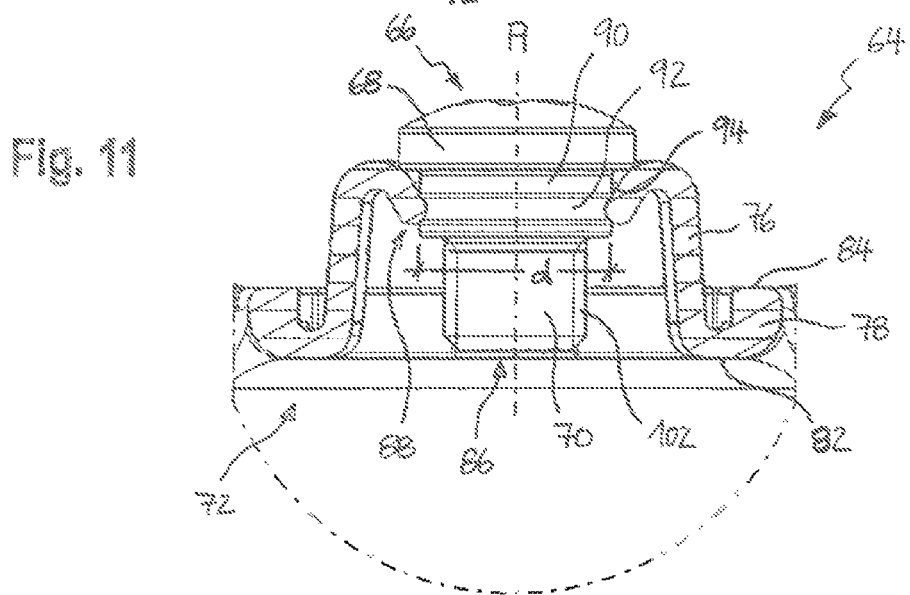
FIG. 11 is a detailed section across the pressure unit according to FIG. 9 in the area of a fastening portion.

The FIGS. 9 to 11 show the pressure unit 64 for pressurizing the belt shaft 12 of the end fitting 11 comprising a screw 66 for fastening the pressure unit 64 to the frame 18 of the end fitting 11, wherein the screw 66 includes a screw head 68 and a screw shank 70 having a shank axis A. The pressure unit 64 accordingly comprises a fastening portion 72 having a screw hole 74 for inserting the screw shank 70, wherein radial play is provided between the screw hole 74 and the screw shank 70, and wherein the fastening portion 72 includes mounting arms 76 on the screw head side for axially fixing the screw 66 in a pre-assembly position according to FIG. 9.

In the shown embodiment the pressure unit 64 comprises a plastic member 78 formed integrally with the fastening portion 72 of the pressure unit 64. Apart from the plastic member 78, the pressure unit 64 moreover includes two spring elements 80 for loading the belt shaft 12 of the seat belt system into its looking position.

In particular, the two spring elements 80 are partly surrounded by injection molding with plastic material of the plastic member 78 in the form of an injection-molded part so that the pressure unit 64 may be easily and inexpensively manufactured and may be geometrically adapted to different end fittings 11 with minimum effort.

According to FIG. 11, the fastening portion 72 of the pressure unit 64 includes a first frame-side contact surface 82 and an axially opposed second contact surface 84 on the screw head side, wherein the end 86 of the screw 66 facing away from the screw head 68 in the pre-assembly position is arranged axially between a free end 88 of the mounting arms 76 and the first contact surface 82 of the fastening portion 72.

In addition, it becomes evident from FIG. 11 that the screw 66 is a collar screw and in the axial direction between the screw head 68 and the screw shank 70 has a screw collar 90, with the diameter d of the screw collar 90 being larger than the diameter of the screw shank 70 and being smaller than the diameter of the screw head 68.

Furthermore, according to FIG. 10 a minimum dimension $S_{min}$ of the screw hole 74 perpendicularly to the shank axis A is larger than the diameter d of the screw collar 90 and smaller than the diameter of the screw head 68. Consequently, an edge of the screw hole 74 forms a stop for the screw head 68, whereas the screw collar 90 may be received in the screw hole 74.

In the axial direction the thickness t of the fastening portion 72 at the edge of the screw hole 74 is slightly larger than the length l of the screw collar 90. Hence the pressure unit 64 can be fixed on the frame 18 of the end fitting 11 with a defined bias while deforming the plastic material of the fastening portion 72.

According to FIG. 11, the screw collar 90 includes a groove 92 peripheral in the circumferential direction, wherein the mounting arms 76 of the pressure unit 64 engage in said groove 92 in the shown pre-assembly position of the screw 66. In the present embodiment, the mounting arms 76 are two opposed radially elastic spring arms which radially inwardly load the screw 66 in its pre-assembly position.

The mounting arms 76 for the rest include inclined surfaces 94 facing the screw head 68, with the screw head 68 being adapted to slide along said inclined surfaces when it is axially loaded in the direction of the frame-side contact surface 82.

In its pre-assembly position according to FIGS. 9 to 11 the screw 66 is captively connected to the fastening portion 72 of the pressure unit 64 and together with the pressure unit 64 forms a pre-assembled subassembly adapted to be easily and reliably mounted, for example on an end fitting 11 according to FIG. 6.

The end fitting 11 of the seat belt system for automotive vehicles then comprises the pressure unit 64 according to FIGS. 9 to 11, the frame 18 made from metal and having a threaded hole 96 for fastening the pressure unit 64 and the belt shaft 12 which is rotatably supported in the frame 18 about a belt shaft axis, wherein the screw 66 extends through the screw hole 74 of the pressure unit 64 with radial play in its final assembly or fastening position (cf. FIG. 15) relative to the shank axis A and is screwed into the threaded hole 96 of the frame 18.

Figure 12:
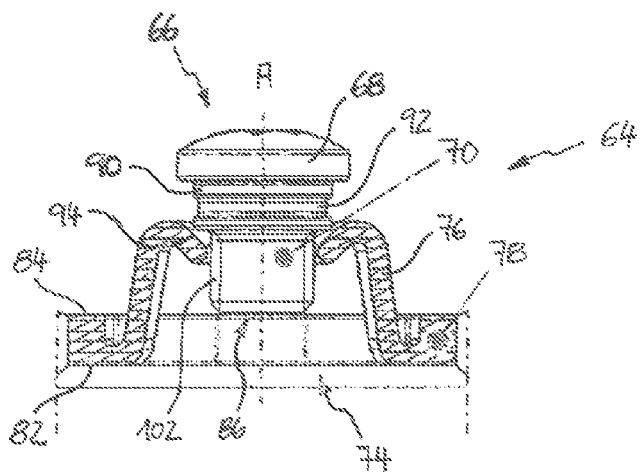
FIG. 12 is a detailed section across the pressure unit according to FIG. 9 during assembly of a screw.
Figure 13:
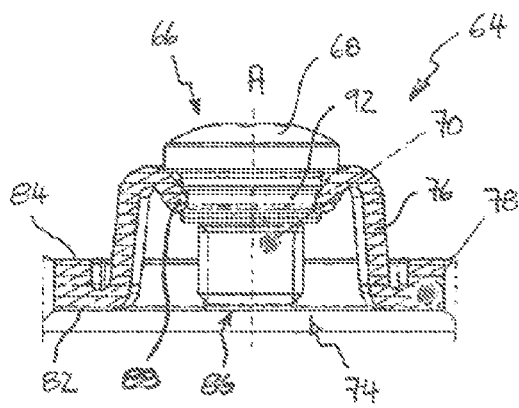
FIG. 13 is a detailed section across the pressure unit according to FIG. 9 in a pre-assembly position of the screw.

FIGS. 12 and 13 illustrate detailed sections of the pressure unit 64 in the area of the fastening portion 72, wherein according to FIG. 12 the screw 66 is pre-assembled on the fastening portion 72 and according to FIG. 13 is in its pre-assembly position.

Figure 14:
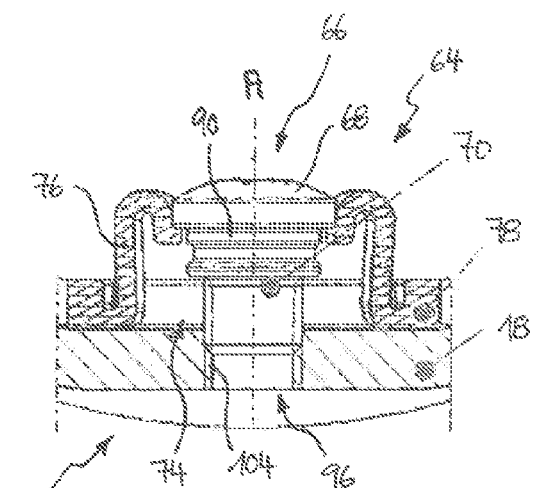
FIG. 14 is a detail cutout of an end fitting of the invention during assembly of the pressure unit according to FIG. 13.
Figure 15:
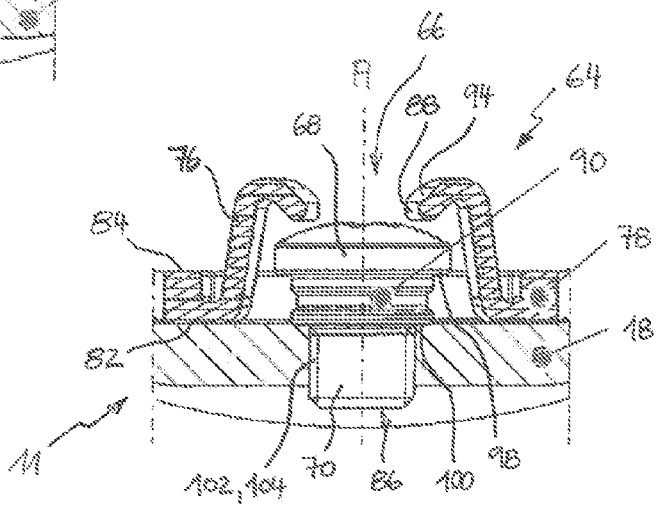
FIG. 15 is a detail cutout of the end fitting according to FIG. 14, with the pressure unit according to FIG. 13 being in a final assembly position of the screw.

FIGS. 14 and 15 illustrate detail cutouts of the end fitting 11 in the area of the fastening portion 72, wherein the pressure unit 64 according to FIG. 14 is mounted on the frame 18 of the end fitting by means of the screw 66 and wherein the screw 66 is provided in its final mounting or fastening position according to FIG. 15.

According to FIG. 12, the screw 66 is initially pressed into the screw hole 74 of the fastening portion 72, wherein the elastic mounting arms 76 are deformed radially outwardly by the screw collar 90 and upon reaching the groove 92 of the screw collar 90 snap radially inwardly and engage in the groove 92. In said pre-assembly position of the screw 66 according to FIG. 13 the pressure unit 64 forms a pre-assembled subassembly with the screw 66.

The pressure unit 64 will then be delivered as pre-assembled subassembly according to FIG. 13 and in the following is mounted on the frame 18 of the end fitting 11 fastened already on the vehicle body side. After positioning the pre-assembled subassembly relative to the frame 18, according to FIG. 14 the screw 66 is further pressed into the threaded hole 96 of the frame 18, until a male thread 102 of the screw shank 70 acts on a female thread 104 of the threaded hole. Accordingly, the mounting arms 76 are deformed radially outwardly by the screw head 68. Finally the screw 66 is screwed into the threaded hole 96 of the frame 18, until it reaches its final assembly or fastening position according to FIG. 15, with the mounting arms 76 snapping radially inwardly on the side of the screw head 68 facing away from the screw collar 90.

The screw head 68 includes on the collar side a contact surface 98 for the fastening portion 72 and the screw collar 90 includes on the shank side a contact surface 100 for the frame 18, wherein in the fastening position of the screw 66 according to FIG. 15 the contact surface 98 of the screw head 63 contacts the fastening portion 72 and the contact surface 100 of the screw collar 90 contacts the frame 18. In other words, this means that the screw 66 is screwed up to a metal/metal contact between the contact surface 100 of the screw collar 90 and the frame 18, which permanently results in a defined and reliable fastening of the pressure unit 64 on the frame 18 of the end fitting 11 while the fastening portion 72 is biased. The fastening is especially independent of the plastic material of the fastening portion 72 whose long-term behavior in terms of creep and ageing effects can hardly be estimated.

In the present embodiment, the pressure unit 64 is configured so that the mounting arms 76 slide radially outwardly on the screw head 68, when the pressure unit 64 is removed from the frame 18, i.e. when the screw 66 is unscrewed. In this way, the screw 66 can be easily moved via the position according to FIG. 14 into its pre-assembly position according to FIG. 13 again and allows re-using the pressure unit 64.

If re-use of the pressure unit 64 is not desired, for example for safety reasons, the screw head 68 and/or the mounting arms 76 may be configured so as to impede or prevent non-destructive removal of the pressure unit 64.

The invention claimed is:

1. A pressure unit for pressurizing a belt shaft (12) in a seat belt system comprising a screw (66) for fastening the pressure unit (64) to a frame (18) of the seat belt system,
   wherein the screw (66) includes a screw head (68) and a screw shank (70),
   wherein the pressure unit (64) comprises a fastening portion (72) including a screw hole (74) for inserting the screw shank (70),
   and wherein between the screw hole (74) and the screw shank (70) radial play is provided and the fastening portion (72) on the screw head side includes mounting arms (76) for axially fixing the screw (66) in a pre-assembly position.

2. The pressure unit according to claim 1, wherein the fastening portion (72) includes a first frame-side contact surface (82) and an axially opposed second screw head-side contact surface (84), wherein the end (86) of the screw (66) facing away from the screw head (68) in the pre-assembly position is arranged axially between a free end (88) of the mounting arms (76) and the first contact surface (82) of the fastening portion (72).

3. The pressure unit according to claim 1, wherein the screw (66) is a collar screw and in the axial direction includes a screw collar (90) between the screw head (68) and the screw shank (70), wherein a diameter (d) of the screw collar (90) is between a diameter of the screw shank (70) and a diameter of the screw head (68).

4. The pressure unit according to claim 3, wherein the minimum dimension ($S_{min}$) of the screw hole (74) perpendicularly to a shank axis (A) of the screw (66) is larger than the diameter (d) of the screw collar (90) and smaller than the diameter of the screw head (68).

5. The pressure unit according to claim 3, wherein the thickness (t) of the fastening portion (72) is slightly larger than the length (l) of the screw collar (90).

6. The pressure unit according to claim 3, wherein the screw collar (90) includes a groove (92) peripheral in the circumferential direction, wherein in the pre-assembly position of the screw (66) the mounting arms (76) of the pressure unit (64) engage in said groove (92).

7. The pressure unit according to claim 1, wherein the mounting arms (76) are radially elastic spring arms.

8. The pressure unit according to claim 7, wherein the mounting arms (76) have inclined surfaces (94) facing the screw head (68) along which the screw head (68), when axially loaded, may slide in the direction of the first frame-side contact surface (82).

9. The pressure unit according to claim 1, wherein the pressure unit (64) comprises a plastic member (78) formed integrally with the fastening portion (72).

10. The pressure unit according to claim 9, wherein the at least one spring element (80) is partly surrounded by injection molding with a plastic material of the plastic member (78) in the form of an injection-molded part.

11. An end fitting of a seat belt system for automotive vehicles comprising:
   a pressure unit (64) according to claim 1,
   a frame (18) made from metal and having a threaded hole (96) for fastening the pressure unit (64) to the frame (18), and
   a belt shaft (12) being rotatably supported in the frame (18) about a belt shaft axis,
   wherein the screw (66) extends in a fastening position with radial play through the screw hole (74) of the pressure unit (64) and is screwed into the threaded hole (96) of the frame (18).

12. The end fitting according to claim 11, wherein the screw (66) is a collar screw and in the axial direction between the screw head (68) and the screw shank (70) includes a screw collar (90), wherein a diameter (d) of the screw collar (90) is between a diameter of the screw shank (70) and a diameter of the screw head (68), wherein the screw head (68) on the collar side has a contact surface (98) for the fastening portion (72) and the screw collar (90) on the shank side has a contact surface (100) for the frame (18).

13. The end fitting according to claim 12, wherein the thickness (t) of the fastening portion (72) is slightly larger than the length (l) of the screw collar (90), wherein in the fastening position of the screw (66) the contact surface (98) of the screw head (68) contacts the fastening portion (72) and the contact surface (100) of the screw collar (90) contacts the frame (18).

14. The pressure unit according to claim 1, wherein the pressure unit (64) comprises at least one spring element (80) for loading the belt shaft (12) of the seat belt system.

\* \* \* \* \*